United States Patent
Kleinpeter et al.

(10) Patent No.: US 10,067,652 B2
(45) Date of Patent: Sep. 4, 2018

(54) PROVIDING ACCESS TO A CLOUD BASED CONTENT MANAGEMENT SYSTEM ON A MOBILE DEVICE

(71) Applicant: Dropbox, Inc., San Francisco, CA (US)

(72) Inventors: Thomas Kleinpeter, San Francisco, CA (US); Andrew Scheff, San Fancisco, CA (US); Anthony Grue, San Francisco, CA (US); Stephen Poletto, San Francisco, CA (US); Andrew Haven, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 135 days.

(21) Appl. No.: 14/247,607

(22) Filed: Apr. 8, 2014

(65) Prior Publication Data

US 2015/0177938 A1    Jun. 25, 2015

Related U.S. Application Data

(60) Provisional application No. 61/920,730, filed on Dec. 24, 2013, provisional application No. 61/945,814, (Continued)

(51) Int. Cl.
  *G06F 3/048* (2013.01)
  *G06F 3/0484* (2013.01)
  (Continued)

(52) U.S. Cl.
  CPC ...... *G06F 3/0484* (2013.01); *G06F 17/30575* (2013.01); *H04L 41/22* (2013.01)

(58) Field of Classification Search
  CPC .... G06F 3/0484; G06F 9/46; G06F 17/30174; G06F 17/30575; G06F 3/0481;
  (Continued)

(56) References Cited

U.S. PATENT DOCUMENTS 5,581,765 A    12/1996  Munroe et al.
6,343,313 B1    1/2002  Salesky et al.
          (Continued)

FOREIGN PATENT DOCUMENTS

EP    1422901 A1    5/2004
EP    3087486       11/2016
          (Continued)

OTHER PUBLICATIONS

Yousef, Kharsim; O'Neill, Eamonn, "Sunrise: Towards location based clustering for assisted photo management"; ICMI'07: Workshop on Tagging, Mining and Retrieval of Human-Related Activity Information, TMR'07—Workshop Proceedings, p. 47-54, 2007, ICMI'07: Workshop on Tagging, Mining and Retrieval of Human-Related Activity Information, TMR'07—Workshop Proceedings; ISBN-13: 9781595938701.

(Continued)

*Primary Examiner* — Andrew T Chiusano
(74) *Attorney, Agent, or Firm* — Keller Jolley Preece

(57) ABSTRACT

A user device has a processing module and a UI module. The processing module may have a permanent connection to the UI module, and an intermittent connection to a content management system over a data network. User requested actions are executed within the UI module. For each such action, a parallel request is sent to the content management system when network connectivity allows. Results of the user requested actions are presented within the UI module as if they had been implemented on the content management system. The user may thus interact with content as if all user requested actions have occurred substantially simultaneously with the request. When network connectivity allows, confirmation is received in the processing module from the content management system that the actions have been implemented, and the state of the user requested actions in (Continued)

the UI module is matched with that on the content management system.

20 Claims, 6 Drawing Sheets

Related U.S. Application Data filed on Feb. 27, 2014, provisional application No. 61/945,817, filed on Feb. 27, 2014.

(51) Int. Cl.
*H04L 12/24* (2006.01)
*G06F 17/30* (2006.01)

(58) Field of Classification Search
CPC .... G06F 3/0482; G06F 9/542; G06F 11/2082; H04L 41/22; H04L 65/403; H04L 51/04; H04L 51/046; H04L 67/06; H04L 67/1097; H04L 67/141
See application file for complete search history.

(56) References Cited

U.S. PATENT DOCUMENTS

| | | | |
|---|---|---|---|
| 6,691,154 B1 | 2/2004 | Zhu et al. | |
| 7,043,525 B2 | 5/2006 | Tuttle et al. | |
| 7,346,616 B2* | 3/2008 | Ramanujam | G06F 17/30578 707/610 |
| 7,424,671 B2* | 9/2008 | Elza | G06F 17/2241 715/234 |
| 7,437,405 B1* | 10/2008 | Theis | H04L 51/38 455/412.1 |
| 7,467,400 B1 | 12/2008 | Moss | |
| 7,546,286 B2* | 6/2009 | Dickinson | G06F 17/246 |
| 7,685,134 B2 | 3/2010 | Myka et al. | |
| 7,702,730 B2 | 4/2010 | Spataro et al. | |
| 7,774,412 B1 | 8/2010 | Schnepel | |
| 7,885,925 B1* | 2/2011 | Strong | G06F 17/30038 707/620 |
| 7,930,362 B2 | 4/2011 | Rumelhart | |
| 7,933,956 B2 | 4/2011 | Hon et al. | |
| 8,185,601 B2 | 5/2012 | Rauhala et al. | |
| 8,225,311 B1 | 7/2012 | Robertson et al. | |
| 8,244,848 B1 | 8/2012 | Narayanan et al. | |
| 8,296,644 B2 | 10/2012 | Koren | |
| 8,370,423 B2 | 2/2013 | Ozzie et al. | |
| 8,510,404 B2 | 8/2013 | Carmel et al. | |
| 8,527,549 B2 | 9/2013 | Cidon | |
| 8,533,231 B2 | 9/2013 | Aizman et al. | |
| 8,611,542 B1 | 12/2013 | Ishii | |
| 2002/0059231 A1 | 5/2002 | Kuwano et al. | |
| 2003/0046434 A1* | 3/2003 | Flanagin | G06F 17/30581 709/248 |
| 2003/0117434 A1 | 6/2003 | Hugh | |
| 2003/0182327 A1 | 9/2003 | Ramanujam et al. | |
| 2004/0230895 A1* | 11/2004 | Elza | G06F 17/2241 715/229 |
| 2006/0143435 A1 | 6/2006 | Kwon | |
| 2006/0242444 A1* | 10/2006 | Novik | G06F 17/30215 713/400 |
| 2006/0277196 A1 | 12/2006 | Oosawa et al. | |
| 2007/0016632 A1 | 1/2007 | Schulz et al. | |
| 2007/0288548 A1* | 12/2007 | Creamer | H04L 67/1095 709/202 |
| 2008/0052783 A1 | 2/2008 | Levy | |
| 2008/0140650 A1 | 6/2008 | Stackpole | |
| 2008/0229215 A1 | 9/2008 | Baron et al. | |
| 2008/0288499 A1 | 11/2008 | Choi et al. | |
| 2009/0030952 A1 | 1/2009 | Donahue et al. | |
| 2009/0094602 A1 | 4/2009 | Ziskind et al. | |
| 2009/0157693 A1 | 6/2009 | Palahnuk | |
| 2009/0282124 A1 | 11/2009 | Rauhala | |
| 2009/0282125 A1* | 11/2009 | Jeide | H04L 67/1095 709/217 |
| 2010/0037161 A1 | 2/2010 | Stading et al. | |
| 2010/0153857 A1 | 6/2010 | Sanchez et al. | |
| 2010/0162126 A1 | 6/2010 | Donaldson et al. | |
| 2010/0205148 A1 | 8/2010 | Leblanc et al. | |
| 2010/0325153 A1 | 12/2010 | Thakkar et al. | |
| 2011/0153696 A1 | 6/2011 | Saxena et al. | |
| 2011/0219307 A1 | 9/2011 | Mate et al. | |
| 2011/0260860 A1 | 10/2011 | Gupta | |
| 2011/0264686 A1* | 10/2011 | Cavagnari | G06Q 10/10 707/769 |
| 2012/0042282 A1 | 2/2012 | Wong | |
| 2012/0054640 A1 | 3/2012 | Nancke-Krogh | |
| 2012/0109590 A1 | 5/2012 | Trainer et al. | |
| 2012/0117271 A1 | 5/2012 | Kennedy et al. | |
| 2012/0131477 A1 | 5/2012 | Marsden | |
| 2012/0179653 A1* | 7/2012 | Araki | G06F 17/30575 707/634 |
| 2012/0287034 A1 | 11/2012 | Park et al. | |
| 2012/0297041 A1 | 11/2012 | Momchilov | |
| 2012/0324589 A1 | 12/2012 | Nukala et al. | |
| 2013/0013560 A1 | 1/2013 | Goldberg et al. | |
| 2013/0021368 A1* | 1/2013 | Lee | H04N 1/00153 345/619 |
| 2013/0054550 A1* | 2/2013 | Bolohan | G06F 17/30902 707/705 |
| 2013/0066963 A1 | 3/2013 | Odio et al. | |
| 2013/0066964 A1 | 3/2013 | Odio et al. | |
| 2013/0132477 A1 | 5/2013 | Bosworth et al. | |
| 2013/0132856 A1 | 5/2013 | Binyamin et al. | |
| 2013/0138608 A1* | 5/2013 | Smith | G06F 17/30575 707/610 |
| 2013/0147845 A1 | 6/2013 | Xie et al. | |
| 2013/0151581 A1 | 6/2013 | Leggette et al. | |
| 2013/0211870 A1 | 8/2013 | Lawson et al. | |
| 2013/0254267 A1* | 9/2013 | Hopkins | G06F 17/30861 709/203 |
| 2013/0332512 A1 | 12/2013 | Roman et al. | |
| 2014/0282243 A1* | 9/2014 | Eye | G06F 3/0482 715/810 |
| 2015/0052458 A1 | 2/2015 | Rothenberger et al. | |
| 2015/0180984 A1 | 6/2015 | Poletto et al. | |
| 2017/0048332 A1 | 2/2017 | Poletto et al. | |

FOREIGN PATENT DOCUMENTS

| | | |
|---|---|---|
| JP | H11259484 A | 9/1999 |
| JP | A 2011-054092 | 3/2017 |

OTHER PUBLICATIONS

Henze, Niels; Boll, Susanne, "Snap and share your photobooks"; MM'08—Proceedings of the 2008 ACM International Conference on Multimedia, with co-located Symposium and Workshops, p. 409-418, 2008, MM'08—Proceedings of the 2008 ACM International Conference on Multimedia, with co-located Symposium and Workshops; ISBN-13: 9781605583037; DOI: 10.1145/1459359. 1459414.

Cathy Marshall ; John C. Tang, "That syncing feeling: early user experiences with the cloud"; Published in: DIS '12 Proceedings of the Designing Interactive Systems Conference pp. 544-553 ACM New York, NY, USA 2012.

Buford, J.; Mahajan, K.; Krishnaswamy, V., "Federated enterprise and cloud-based collaboration services"; Source: 2011 IEEE 5th International Conference on Internet Multimedia Systems Architecture and Application (IMSAA), 6 pp., 2011.

International Search Report issued in PCT/US14/072110 dated Mar. 11, 2015.

U.S. Appl. No. 14/247,528, dated Feb. 18, 2016, Office Action.

International Search Report issued in PCT/US14/072115 dated Mar. 11, 2015.

U.S. Appl. No. 14/247,528, dated Sep. 1, 2016, Notice of Allowance.

(56) References Cited

OTHER PUBLICATIONS

U.S. Appl. No. 15/335,161, dated Jan. 24, 2018, Notice of Allowance.
Examination Report as received in European Application 14825577.1 dated Aug. 8, 2017.
Examination Report as received in European Application 14825578.9 dated Aug. 7, 2017.
Notice of Allowance as received in Japanese patent application 20033.22.1JP dated Oct. 10, 2017.
U.S. Appl. No. 15/335,161, dated Sep. 5, 2017, Office Action.

* cited by examiner

PROVIDING ACCESS TO A CLOUD BASED CONTENT MANAGEMENT SYSTEM ON A MOBILE DEVICE

CROSS-REFERENCE TO RELATED APPLICATIONS

The present application claims the benefit of U.S. Provisional Patent Application No. 61/920,730, filed on Dec. 24, 2013, entitled "SYSTEMS AND METHODS FOR PROVIDING SHARED VIRTUAL SPACES ("STREAMS")", U.S. Provisional Patent Application Publication No. 61/945,814, filed on Feb. 27, 2014, entitled "SYSTEMS AND METHODS FOR CREATING SHARED VIRTUAL SPACES," and U.S. Provisional Patent Application No. 61/945,817, filed on Feb. 27, 2014, entitled "PROVIDING ACCESS TO A CLOUD BASED CONTENT MANAGEMENT SYSTEM ON A MOBILE DEVICE," each of which is hereby incorporated herein by reference in their entirety.

FIELD OF THE INVENTION

Various embodiments generally relate to systems and methods for providing access to a cloud based content management system on a user device.

BACKGROUND

While photograph applications, video applications, and other content sharing applications have become increasingly popular, the services and features currently provided by these sorts of applications come with inherent limitations. Recognizing these limitations, online content management systems ("CMSs") offer a user a convenient portal for cloud storage and interactivity with his or her content. In such systems, as well as in applications running on user devices which they support, users may upload and perform various operations on content, such as photographs and videos, for example. Some of these operations may be quite complex, and may involve large amounts of content. Such operations may, for example, include uploading photographs or videos to a user account, receiving shares of photographs or videos from other users and copying them to their own account, sharing them with other users of the content management system, creating albums or collections of such content and sharing same, interacting with the content items or any user defined aggregations of the content, and interacting with the shares in various ways.

Conventionally, there are various options for implementing a local application on a user device. For example, the local application may be implemented fully locally in that all content is stored and managed on the user device. Thus, in order to share content, the local application may rely on electronic communications to pass content directly to and from other users' devices. However, this type of implementation limits the amount of content a user may store in his account to the capacity of his or her user device. Further, complex messaging and data management techniques may be required to replicate the state of content items that are exchanged or shared across all relevant user devices.

Alternatively, a local application may interface with an application running on a server that manages and stores the user's content. In this implementation, the server may control, store, and/or manage content associated with any user account on the system. The server may also record any changes, shares, messages, etc. between users inter se, or users and third parties. This server-managed option affords the best opportunities for storing large amounts of user data (since the data need not be stored in the user's local device) as well as for managing sharing and other interactions between users of the content management system.

One drawback of the server driven model is that local interaction with the user's content is limited to when connectivity between the user device and the server is sufficiently high. If a user device is weakly or intermittently connected to the content management system server across a data network (e.g., a smartphone connected to a cellular network), content created and actions taken locally on the user device that require the content management system server to store, acknowledge, organize, or otherwise manage the user's data cannot be processed until suitable network connectivity is restored. Thus, for example, while a user may attempt to upload a collection of photographs from her smartphone using a local application, the photographs may not actually be uploaded to the server for many hours and, therefore, content management functionality such as sharing, reviewing, editing, for example, may not be immediately available.

It would be highly desirable for the user to be able to experience a seamless response of a local content management system application regardless of connectivity with the content management system server, to facilitate (i) the creation of content, (ii) the addition of content items or messages to a user account or other user accessible data structure, (iii) the downloading of shared content to a personal account within the content management system, and (iv) other responses to his or her interactions with the application. At the same time, unless connectivity to the server is guaranteed to be sufficient, this is not always possible because while the connectivity on a user device between the user interface and a local application is permanent, the connection between the local application and the remote server may often be intermittent.

What are needed in the art are systems and methods for providing access to a cloud based content management system on a user device.

SUMMARY

Systems and methods are disclosed for providing access to a cloud based content management system on a user device.

In various exemplary embodiments, any content added by a user to his or her account locally on a user device may be displayed, and all interactivity therewith may be facilitated, as if the content had already been uploaded to a server of a content management system. Accordingly, a server-run content management system application operating on a user device may appear to run as a fully local application without waiting for server responses or confirmations.

Moreover, in content management system applications that support shared virtual spaces, changes made by the user from his or her user device to the shared virtual space may be displayed locally as soon as the change has been made without waiting for the information to be transmitted to the server for the server's state to be made consistent with that of the user device. Thus, a number of shared virtual spaces may be created locally, and various content items may be added to them, prior to any of the information reaching the content management system server. To the user it appears as a completed task. Thus, in such exemplary embodiments, any image added by the user to the shared virtual space is displayed, as is any message or post added to or associated with such an image, and all interactivity therewith is facilitated, as if (i) the shared virtual space had already been created on the content management system, and (ii) the at least one image had already been copied to it. A similar functionality may facilitate adding content to an already existing shared virtual space.

In some embodiments, a user device may be provided with a user interface module and a processing module. The processing module may also handle all network communications. The processing module may be communicably connected to the user interface module over a direct connection, and communicably connected to a content management system over a wireless connection. The processing module may be provided with a listener module that may register a content item or a content data structure created in the user interface module.

The user interface module may receive user requests for additions of content items to a user account and/or interactions with content items or other data. The requested additions or interactions may be stored in a local datastore in the processing module with each content item or data structure being referenced by a local identifier. The local identifier may be communicated to (i) the user interface module and (ii) any processor module that has registered the content item or content data structure with the listener module.

When a user makes a local request to add content or interact with content or content data structures, the results of such a request may be locally represented substantially immediately following receiving a user request as if the request had already been executed on the content management system. In parallel, the processing module may queue request for upload to the content management system server whereupon the server may assign global identifiers to content or interactions associated with the request.

Upon receipt of the global identifier at the user device, the processing module can communicate the global identifier to the user interface module and/or to any content item or content data structure registered within the listener module. Previously assigned local identifiers may than be replaced with the global identifiers. The process may occur seamlessly from the point of view of the user such that the user may be unaware of whether or not a particular content item or data structure is associated with a local identifier or a global identifier.

Thus, in some embodiments, a content management system application on a user device may be provided with a user interface module and a processing and network communications module. The user interface module may be communicably connected to the processing and network communications module, and the processing and network communications module may be intermittently connected to a server of a content management system over a data network. User requested actions may be executed within the user interface module substantially immediately regardless of the status of the network connection between the user device and the server. Parallel requests may be sent over the data network by the processing and network communications module to the content management system when network connectivity allows.

The results of all user requested actions may thus be presented within the user interface module as if they had already been implemented on the content management system, thus allowing a user to interact with all content (known to the user device at the time) as if all user requested actions have occurred substantially simultaneously with their request.

When network connectivity allows, the processing and network communications module may receive confirmation from the content management system that the user requested actions have been implemented and, based on the received confirmations, the state of the user requested actions in the user interface module may be matched with the state of the user requested actions on the content management system.

BRIEF DESCRIPTION OF THE DRAWINGS

The above and other aspects and advantages of the invention will become more apparent upon consideration of the following detailed description, taken in conjunction with accompanying drawings, in which like referenced characters refer to like parts throughout, and in which.

DETAILED DESCRIPTION OF THE DISCLOSURE

Figure 1:
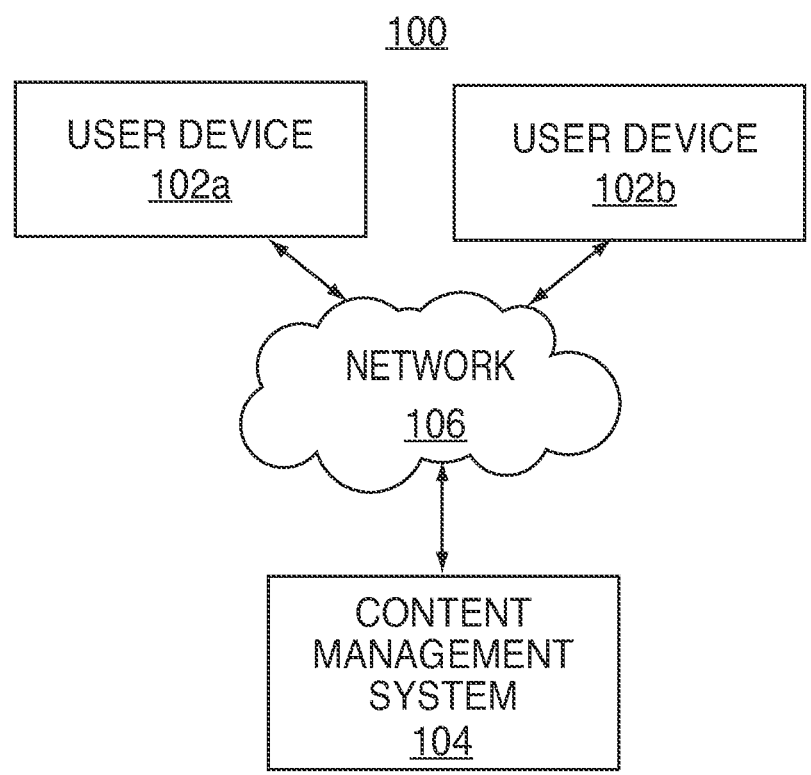
FIG. 1 shows an exemplary system in accordance with various embodiments of the present invention.

Systems and methods for providing access to a cloud based content management system on a user device are disclosed. In various exemplary embodiments, any content added by a user to his or her account locally on a user device may be displayed, and all interactivity therewith may be facilitated, as if the content had already been uploaded to a server of the content management system.

This functionality may be integrated into an existing content management system or service, provided as a separate application, or provided as one of many features in a separate application providing enhanced content management services. An exemplary content management application may run on a user device, such as, a smartphone, for example, and may access a user's account registered with a content management system. Such an application may support complex multi-party interactions, such as, for example, shared virtual space functionalities. While the content management application running locally on the user device may be ultimately supported from such a server or servers, extended functionality may be available using the content management application, such that, the shared virtual space functionality appears as if it is running locally on the user device—whether the user device is weakly connected, intermittently connected, or disconnected to the server. By enabling a user to feel as though their device is fully interactive even when connectivity is limited, the user experience and richness of functionality provided to the user may be greatly increased.

It is noted that the terms "device" and "content management system" are used herein to refer broadly to a wide variety of storage providers and data management service providers, electronic devices and user devices. It is also noted that the term "content item" is user herein to refer broadly to a wide variety of digital data, documents, text content items, audio content items, video content items, portions of content items, and/or other types of data. Content items may also include files, folders or other mechanisms of grouping content items together with different behaviors, such as collections of content items, playlists, albums, etc. The term "user" is also used herein broadly, and may correspond to a single user, multiple users, authorized accounts, an application or program operating automatically on behalf of, or at the behest of a person, or any other user type, or any combination thereof. The term "gesture" and "gestures" are also used herein broadly, and may correspond to one or more motions, movements, hoverings, inferences, signs, or any other such physical interactions with one or more sensors, or any combination thereof, including vocal commands or interpretations of eye movements based on retinal tracking. The term "continuous real-time image" is also used herein broadly, and may correspond to live images captured via one or more image capturing components, continuous images captured, recorded images, or any other type of image that may be captured via an image capturing component, or any combination thereof.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

FIG. 1 shows an exemplary system in accordance with various embodiments. System 100 may include user devices 102a and 102b, which may communicate with content management system 104 across network 106. Persons of ordinary skill in the art will recognize that although only two user devices are shown within system 100, any number of user devices may interact with content management system 104 and/or network 106, and the aforementioned illustration is merely exemplary.

Network 106 may support any number of protocols, including, but not limited to, Transfer Control Protocol and Internet Protocol ("TCP/IP"), Hypertext Transfer Protocol ("HTTP"), and/or wireless application protocol ("WAP"). For example, user device 102a and user device 102b (collectively 102) may communicate with content management system 104 using TCP/IP, and, at a higher level, use a web browser to communicate with a web server at content management system 104 using HTTP.

A variety of user devices 102 may communicate with content management system 104, including, but not limited to, desktop computers, mobile computers, mobile communication devices (e.g., mobile phones, smart phones, tablets), televisions, set-top boxes, and/or any other network enabled device. Various types of user devices may include, but are not limited to, smart phones, mobile phones, tablet computers, personal digital assistants (PDAs), laptop computers, digital music players, and/or any other type of user device capable of including a touch-sensing display interface. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive and detect gestures. Multi-touch panels, for example, may include capacitive sensing mediums having a one or more of row traces and/or driving line traces, and one or more column traces and/or sensing lines. Although multi-touch panels are described herein as one example for touch-sensing display interface, persons of ordinary skill in the art will recognize that any touch-sensing display interface may be used. Furthermore, various types of user devices may, in some embodiments, include one or more image capturing components. For example, user devices 102 may include a front-facing camera and/or a rear facing camera.

Content management system 100 may allow a user with an authenticated account to store content, as well as perform management tasks, such as retrieve, modify, browse, synchronize, and/or share content with other accounts. In some embodiments, a counter-part user interface (e.g., stand-alone application, client application, etc.) on user devices 102 may be implemented using a content management interface module to allow a user to perform functions offered by modules of content management system 104. A more detailed description of system 100 is presented below, with reference to FIG. 6.

Figure 2:
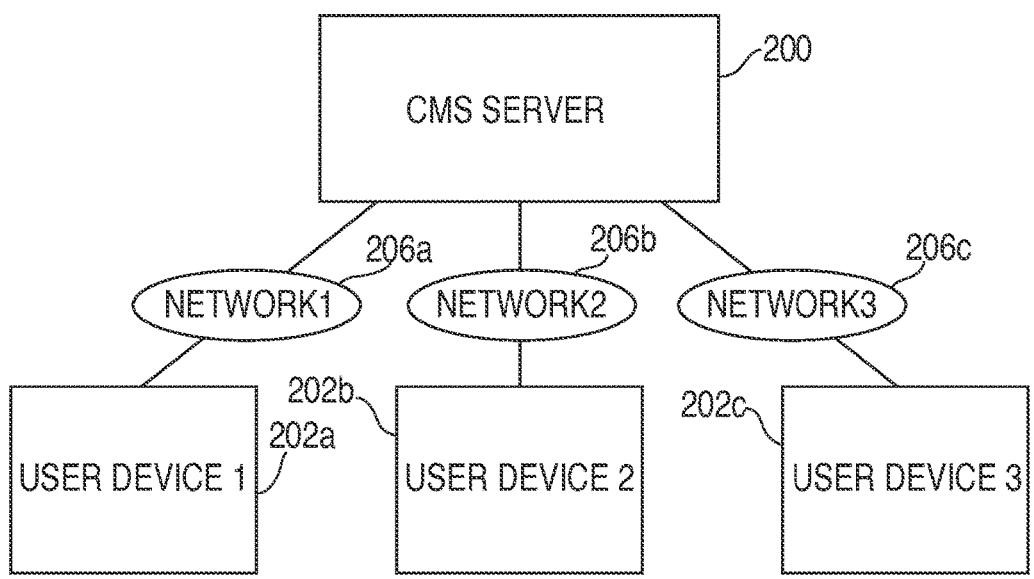
FIG. 2 shows a schematic of an exemplary simplified network where three user devices connect to a content management system server over three data networks.

FIG. 2 schematically shows an exemplary simplified network of three users on three user devices (e.g., smartphones) each connected across a network (e.g., a cellular network) to a content management system server. With reference to FIG. 2 there is shown content management system ("CMS") server 200 and user devices 202a, 202b and 202c. User device 220a is connected to CMS server 200 across Network1 206a, user device 202b is connected to CMS server 200 across Network2 206b, and user device 202c is connected to CMS server 200 across Network3 206c. Because user devices 202a-c connect to CMS server 200 over a different network connections and may be located in physically different places, interactions over the network connections may be associated with different network delays, and one or more of user devices 202a-c may experience lapses in network connectivity at various points throughout the day.

While implementing a content management application locally on each of user devices 202a-c, race conditions may arise between the users. For example, if each of the three users requests to create a shared virtual space with all three users as members, it may happen that the request initiated from user device 202a may reach CMS server 200 first even though the request from user device 202b may have been initiated first. Thus, the server may consider user device 202a as having originated the virtual shared space even though the first request to create the shared virtual space was initiated from user device 202b. Such race conditions may give rise to undesirable results, such as creating duplicate copies of content items or shared virtual spaces on CMS server 200 and/or user devices 202a-c.

The schematic network of FIG. 2 also illustrates how, if a content management application running locally on user devices 202a-c is to provide full interactivity, it would need to maintain its connection to CMS server 200 at a sufficiently high quality of service to support the needed bandwidth. Due to network connectivity issues, there may be many instances where (i) objects are created (e.g., a user attempts to upload a photograph), (ii) multi-party, multi content item data structures or constructs are created (e.g., a user creates a virtual shared space), or (iii) a user interacts with a content items or data structure before at least some of the related content is received at CMS server 200. In such instances, the various systems and methods according to exemplary embodiments of the present invention are operative.

Example of Complex Local Creation of Content and Interaction Therewith: "Rooms"

To fully illustrate certain aspects of the present invention, local interaction with respect to shared virtual space functionalities will be referred to. Such functionality is described in detail in U.S. Provisional Patent Application No. 61/945, 814, filed under common assignment herewith, entitled "SYSTEMS AND METHODS FOR PROVIDING SHARED VIRTUAL SPACES," the disclosure of which is hereby fully incorporated herein by reference.

The Rooms Application describes multi-party shared virtual spaces, known sometimes as "rooms," singular "room." A room may be defined as a virtual space accessible by a set of users of a content management system where the users may mutually share content items and messages relating thereto. The content management system may manage a user's rooms and all content items, messages, and interactions associated therewith. The multiple parties to a room can include the room's creator, all other persons with whom the creator shared the initial content, and/or any other person subsequently invited. These parties may sometimes be referred to as "members" of the room.

In some embodiments, a room may be automatically created anytime a user of the content management system shares content items or messages about content items with another user. In one example, a share request may be received to share one or more content items with one or more of a user's contacts. In response to receiving the share request, a room may be automatically created that includes a copy of, or link to, the one or more shared content items. The room may be associated with an assigned memory location on a system server (e.g., data store 118 of FIG. 1). The room may be accessed by both the user and the other members, and each member may add further content (e.g., content items and messages) to the room. Whenever any content is added to a room, all member parties may be notified. In some embodiments, other non-members may also be notified, even persons not registered as users with the content management system. Notifications may be in-band (i.e., via communications within the content management system or an application provided by such a system), out-of-band (e.g., via e-mail, SMS, or a social media notification or post), or any combination of these communications pathways.

As used in the Rooms Application, a room is said to have "members." Depending upon the embodiment, members may be exclusively registered users of the content management system providing the rooms functionality. In other exemplary embodiments, non-registered users of the content management system may be designated as members of rooms, either in whole or in part. In these embodiments, a given person may be a member of a room regardless of their status as a registered user of the content management system In some embodiments, members of a room may be permitted to copy any content in the room to their individual accounts on the content management system and/or freely send copies of such content to other persons via email, SMS or a post to a social media application. Each of the parties invited to a room may conveniently access the room at any time, as a room may be a permanent or semi-permanent data structure designed to store and facilitate mutual interaction with room content. In some embodiments, a content item added to a room may be copied to a separate "rooms" database, and "locked." That is, even if the content item's original owner subsequently modifies the original content item within the confines of his or her user account, such modifications may not be applied to the content items extant to the room. Any content added to a room may be saved in the room for a defined period of time, which may, for example, be indefinitely.

In some embodiments, local changes requested by a user to the shared virtual space (e.g., additions of content, posts, adding new people, etc.) may be displayed locally as soon as the change has been requested. It may be unnecessary to wait for the changes to be transmitted to the server prior to displaying the changes locally. Thus a number of rooms may be created locally, various content items may be added to the rooms, and various persons may be added to them as members prior to any of this information reaching the content management system's server. To the user, it may appear as if the request was completed as soon as the interaction occurs. This functionality may be made possible by the systems and methods of the present invention. Thus, "rooms" functionality may serve as a pointed example for illustrating various aspects of the present invention, as the complexity of such rooms highlights the problems that are addressed by various embodiments of the present invention.

As noted above, in various exemplary embodiments, user content and interactions therewith may be ultimately managed by a server of a content management system. However, a user may interface with the content management system via a user interface provided by a content management application running on a user device in communication with the server over a data communications network. In such embodiments, it would be highly desirable for the user of the user device to experience a seamless response of the user interface with respect to (i) the creation of content items or content data structures (e.g., photos, videos, "rooms," etc.), (ii) the addition of content items or messages to a user account or an existing room, (iii) the downloading of content from a room to a personal account within the content management system, and (iv) other responses to his or her interactions with the application. These goals are not always easily accomplished where, while the connectivity on a user device between a user interface and the content management application is permanent, the connection between the content management application and the remote server may often be intermittent.

In some embodiments, content may be managed with reference to a unique index number or identifier assigned to, or associated with, the content. In standard content management systems, each user may be assigned a unique identifier, and all content and interactions of that user may utilize the unique identifier to allow the content management system to properly store content items and implement various supported interactions in his or her account.

Whether a user creates a room by initiating a share of certain content, adds content to a room, the operations may look essentially the same to the server. However, in the former case no Room ID exists when the share is made in while in the latter case a Room ID already exists. When a user first creates a room, a request for a Room ID may be sent from the content management application to a server of the content management system. If the content management application has to wait until the Room ID is received back from the server, it cannot create the room or show content within the room until the Room ID is received. This process may cause wait states if the connectivity between client application and server is intermittent. In order to prevent a weak or intermittent data connection between the user device and the remote server from detracting from an appearance of full local functionality, actions requested by the user may be reflected back into the user interface even if the server has not acknowledged the actions or fulfilled or processed the requests.

For example, to take a simple case, a user may decide to create a room while the user device has weak, intermittent, or no connectivity with a server of the content management system. The user may choose a number of content items to share in the room and a number of persons to add to the room. Upon sharing, the content management application may create the room on the user device. At that point, the content management application may inform the user interface of the new room and at least attempt to inform the server of the new room. If the server is not accessible at the time, a message informing the server of the new room may be queued to be sent to the server when a suitable network connection becomes available. Nonetheless, if the user adds a comment to the room, it may be displayed in the room in the local user interface even if the message has not yet been sent to, or processed on, the server. That is, something must be done locally to "fill the gap" because it may be disconcerting for a user to content to a room and not actually see the comment for a significant time. Thus, even if connectivity is still poor or nonexistent, in exemplary embodiments of the present invention the user may nonetheless experience a smooth and nearly seamless local experience. In such embodiments, the content management application may simulate the activity on the user device while waiting until a later time to send a "create room and assign Room ID" message to the server.

In order to simulate the activity, the content management application may create a local ID and a new post table (e.g., a table that manages which posts are in a room, which rooms there are, etc.). The content management application may create these results locally, as if the new room existed globally, and as if the content was really posted to a room. In order to maintain seamless interaction on each user device once the server responds, a global Room ID may be associated with the local room ID, and the local room ID may be replaced by the global room ID. To prevent actions from being executed twice or not executed at all, if a local room ID is be included in a queued instruction, the switch of IDs may occur either while the instruction is in a queue but not yet executed or after the instruction has been executed. If the switch occurs while the instruction is executing, an ambiguity may arise.

For example, a user may take some photos with a smartphone on which she also has a rooms application running and attempt to share the photos with one or more other users in a new room. If the smartphone is not connected to the content management system's server (e.g., due to network issues), the photos and room creation request may remain queued for upload to the server while being implemented locally. Thus, these photos photos and the new room may only be associated with local IDs. The tasks of requesting global IDs for the room and for each photo and the task of adding the photos to the room may be queued while being executed locally. If connectivity with the server resumes while some of these instructions are in the process of being implemented, it may be necessary to manage the replacement of local IDs with the global IDs so that no task is missed, and no task is performed twice (i.e., performed a first time referencing the local ID and a second time referencing the global ID).

Conventional (Server Based) Approach

Figure 3:
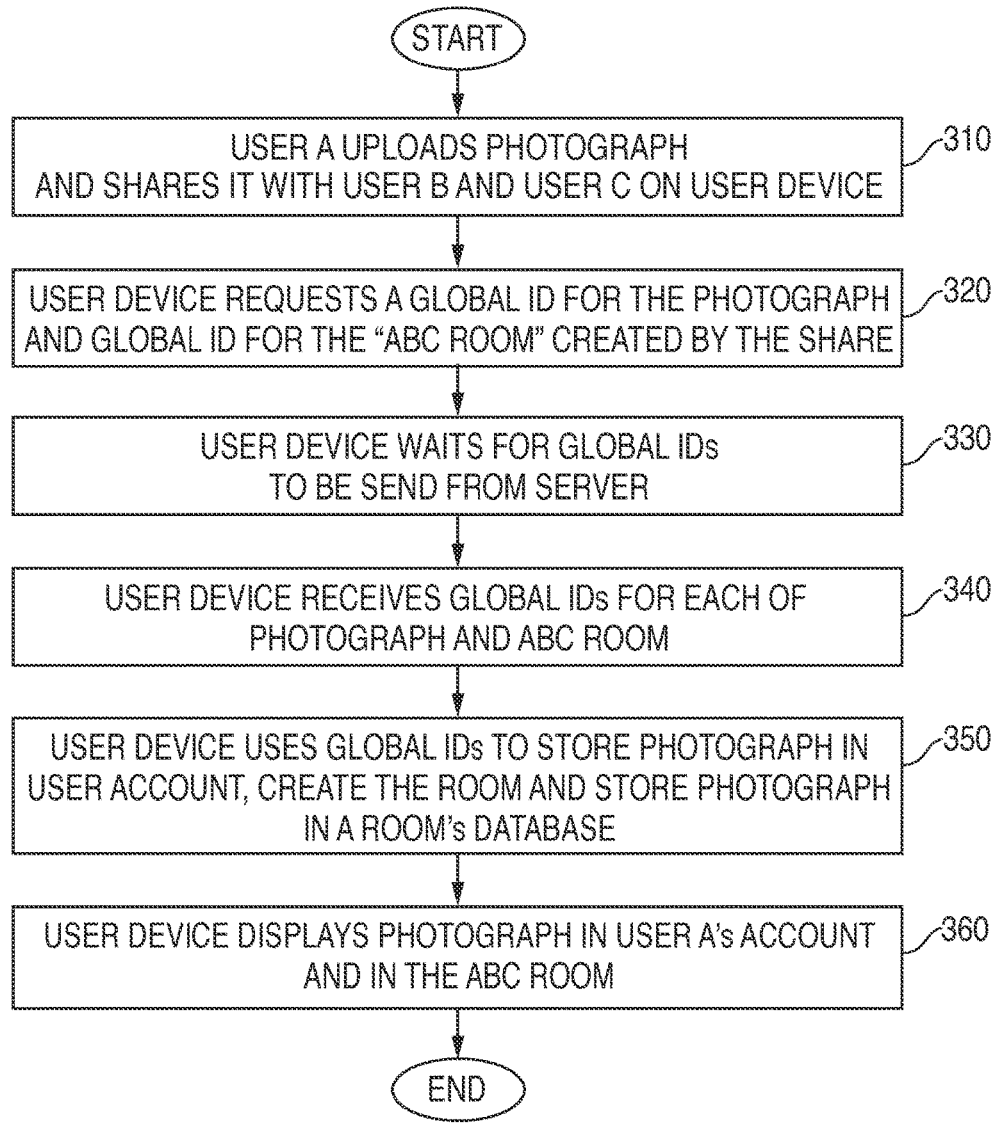
FIG. 3 shows an illustrative flowchart of an exemplary conventional process for uploading photographs and sharing them with other users on a user device for a server managed content management application.

To illustrate how slow, intermittent, nonexistent, or otherwise poor network connectivity can introduce significant wait states, FIG. 3 shows an exemplary process flow of a conventional content management system application running on a user device. In the exemplary conventional application depicted in FIG. 3, there exists no method or system by which a content item, data structure, or operation created by a user can be managed until the content management system acknowledges the creation and assigns a global ID to the object, construct or operation.

With reference to FIG. 3, process flow begins at Start and moves to step 310 where User A uploads a photograph and shares the photograph with each of User B and User C via a user device. For purposes of illustration, the application depicted in FIG. 3 is a content management application incorporating the novel "rooms" functionality described in the Rooms Application but portrayed as if it were implemented in a conventional server based system. In such an application, a user can create a virtual shared space by sharing a content item, such as a photograph or a video, with one or more other users with a server of the content management system managing receipt of the content item, creation of the room, and subsequent communications with the relevant user devices. Once the initial sharing is done, a virtual shared space may exist that is managed by the content management system. Therefore, at step 310, two logical objects may be created: (1) the content item, which is uploaded from User A's user device into his or her account in the content management system; and (2) the virtual shared space, which may be defined by the content management system after the content item, designated to be shared with User B and User C, is received at the server. Therefore, there are two objects that need to be assigned a global ID. Additionally, the content management system needs to associate the content item with the shared virtual space. This association may be reflected in a record associated with the shared virtual space.

From step 310, the process flow moves to step 320 where the user device processes the user actions described in 310. The user device thus requests global IDs for the content item and the virtual shared space, it being understood that in the illustrative process of FIG. 3, there are only global IDs. The shared virtual space may be created by User A when upon sharing the content item with Users B and C. Because a room or virtual shared space may easily be designated according to the members of the room for convenience, it is termed the "ABC Room." As noted, not only will a global ID be required for both of these objects, but instruction will also need to be sent to associate the content item, by its global ID, with the ABC Room by its global ID.

From 320, process flow moves to step 330. Herein lies the distinction from the present invention: the user device must wait for the global IDs to be sent from the content management system's server before it can treat those objects as existing and/or display them within the content management application on the user device. If there is no issue of network latency or connectivity, the user will not perceive any delay or artifact due to step 330. However, if for some reason there is a network delay, or network congestion, or, for example, if the user is accessing the content management system via a smartphone over a cellular network, and such user is travelling in an area where the signal is either barely present, marginally present or not present, then there could be long periods of time when the user device is disconnected from the network. In such instances, step 330 can be quite annoying. The user may be required to wait for seconds, minutes, hours, or more for: the photograph to be displayed in the content management application, to be able to share the content item, for the room to exist, and the content item to be displayed in the room.

From step 330 the process flow moves to step 340 where the user device receives global IDs for each of (i) the content items and (ii) the ABC room. The process flow them moves to step 350 where the user device may now use the global IDs to (a) store the photograph in the user's account, (b) create the ABC room, and (c) store the photograph in a room's database so that it can be associated with and displayed in ABC room. From step 350 the process flow moves to step 360 where the user device displays the photograph in User A's account, displays ABC room within the user's content management system application, and displays the photograph in ABC room. And from there, process flow ends.

Figure 4:
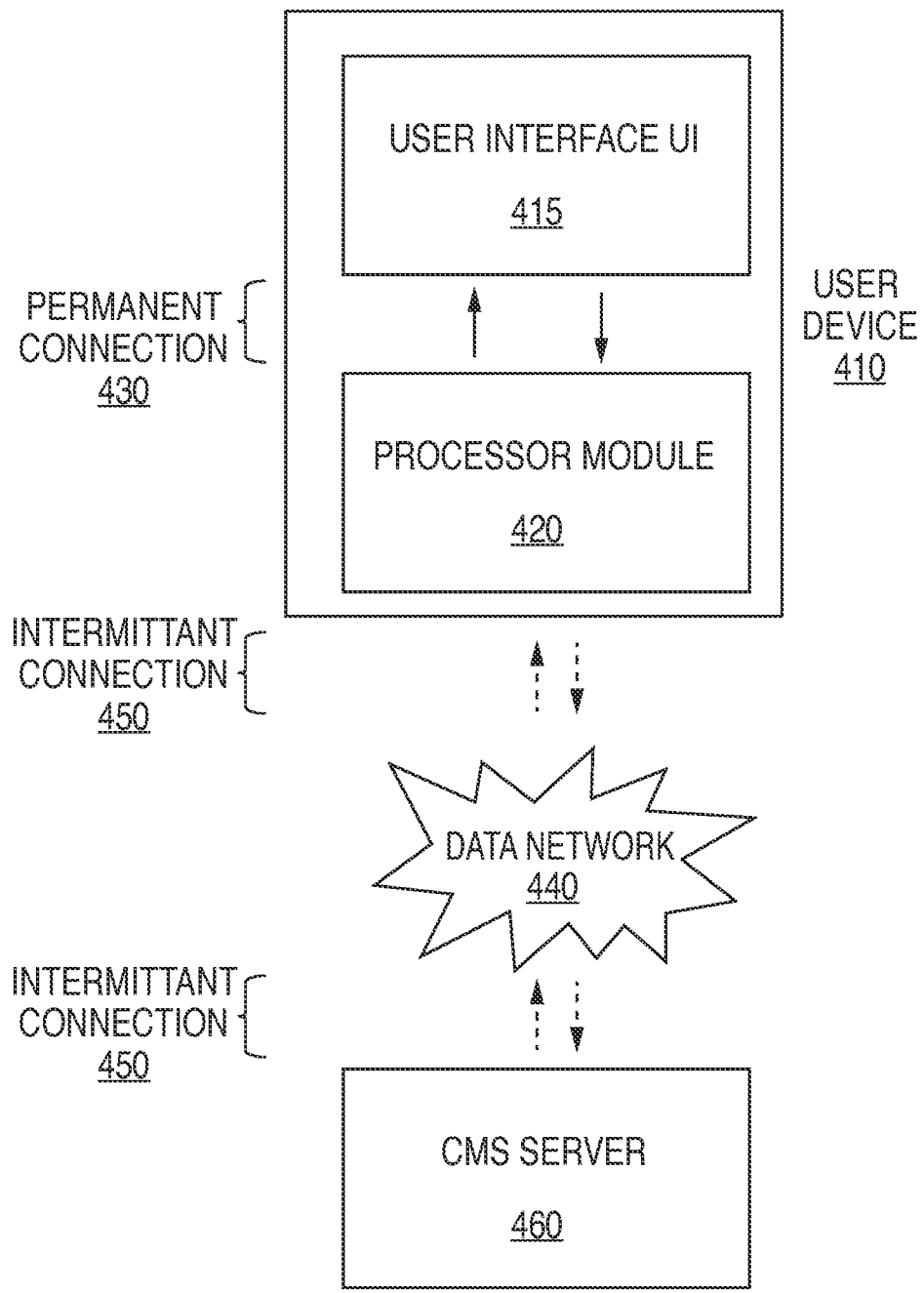
FIG. 4 shows a schematic diagram of a user device and its two modules according to an exemplary embodiment of the present invention.

As noted, the significant drawbacks of the process flow depicted in FIG. 3 will be felt by a user anytime the user device is marginally connected, weakly connected, or not connected at all to the content management system. It is to remedy this situation, and prevent concomitant wait states, race states, or other glitches that the exemplary process flow depicted in FIG. 4 may be implemented in various exemplary embodiments.

Division of User Device into User Interface and Processing Modules; Functionality of Each Module In exemplary embodiments of the present invention, a user device may be divided into two modules. This is shown schematically in FIG. 4. With reference thereto, user device 410 has a user interface ("UI") module 415, and a processor module 420. The UI module 415 has a permanent (hardwired or the like) connection 430 to processor module 420. Processor module 420, which may handle network communications, has an intermittent connection 450, through data network 440, to a content management system ("CMS") server 460.

Processor module 420 may include a shared library of software that may be used with various computer platforms, including Android™ and iOS type devices, for example. As noted, processor module 420 maintains a connection to CMS server 460 and thus exchanges information between the server and the content management application running on user device 410. Processor module 420 provides to UI module 415 a view of a user's account with both global and local data taken into account. Thus, for example, in a rooms application, processor module 420 may provides data regarding a user's rooms and the contents of each room that combines (i) data that has been synchronized with the server and (ii) data that has been generated locally but that has not yet been synchronized with the server.

In exemplary embodiments of the present invention, processor module 420 may be provided with a database called the "cache," which is essentially a local cache of the server state. This "cache" database may hold all of a user's photos, all of a user's rooms, and all of the contents of those rooms, and it may be kept up to date, for example, with a "delta" thread. The delta thread may be a continually running process that runs when the user device has sufficient connectivity with CMS server 460, when informs the server "I have all this data up to a point A," for example. CMS server 460 may then either respond that the cache is up to date or provide some new information that needs to be added to the cache. In the event that user device 410 is not generating any new data, the delta thread runs, receives changes from CMS server 460, and applies those changes to the cache. Thus, in the case when a user is not actually adding any content or interaction, it is relatively simple. UI module 415 essentially asks the processor module 420 for the contents of a given room or set of rooms, for example. Processor module 420 may then consult the cache and return the current data. As this delta thread changes, processor module 420 may push these changes into UI module 415 if the UI module has expressed interest in a particular room or in the set of rooms. As described more fully below, UI module 415 may express interest by registering a listener for the room). In this way it is not necessary to push each and every update to the cache from processor module 420 into UI module 415, thus saving processing and minimizing power draws.

In one particular example, a user may be a member of several rooms. However, she may only really regularly look at and interact with at a small subset of them. For those rooms interest has been expressed. However, for a room she may not have visited in six months, it is not necessary to push cache changes, and the user need not be alerted as to changes to the content of those rooms.

Listener Functionality

In exemplary embodiments of the present invention, as noted above, UI module 415 may express interest in a content item, other user, or a room, for example, by registering a "listener" for that content. There may be, for example, a rooms listener, a post listener, and even a "room members" listener. Thus, as the delta thread runs, it may pick up changes in server state and determine whether any registered listeners are interested in those changes. If there are, it may call methods on these listeners saying, for example, "here is a new room, here is an updated room, here is a new post, here are the photos that go in this post."

That is the simple case when the user is not actually changing anything. A more complicated case is when the user is also generating local content via UI module 415. In that case, there may be some data or some state that has already been stored in the local database but has not yet been sent to CMS server 460. This data may also be stored in the user device "cache" in processor module 420 so that it can be stored persistently. Thus, if a user creates a post, and then, for example, her smartphone crashes, the application may save the post such that when the user restarts her phone, that post may still be sent to the content management system server without getting lost.

In exemplary embodiments of the present invention, a user's interaction with the content management application may generate various operations, which can be sent to an operations queue. For example, actions a user takes with respect to a room may be expressed in the operations queue. These actions may include, for example, creating a new room, creating a new post, adding a member to a room, saving some photographs from a post, or marking a room as being "read" so that the user stops receiving notifications about it. All these things can affect the user's view of either a room or a list of her rooms, and thus they all may be applied on top of the existing state for purposes of rendering the proper UI view to the user. Thus, what a user wants to see is (i) the existing state that is in the database and matched with the server plus (ii) a replay of all of the local operations that have been queued on top of that state to obtain what the UI should represent. So if, for example, there are two rooms (server perspective) and the user adds two new rooms (only within user device perspective), even if those two new rooms have not yet been sent to the server, UI module 415 may render all four rooms to the user when she uses the application.

A simple case is next provided as an example. A user may have one or more rooms already in the cache and requests for some new rooms in the operations queue. These new rooms may not have been sent to CMS server 460, either because previously queued operations are still executing or because the user device does not have suitable connectivity, for example. UI module 415 may then register a listener. In exemplary embodiments of the present invention, UI module 415 may then fetch information out of the cache regarding the rooms the server is already aware of Processor module 420 may then walk through the operations in the order that they were created and update the user's list of rooms to add the two new rooms, which at this point may only be known locally. If an operation modifies an existing room, processor module 420 may modify the copy of the room that was fetched from the cache, such as by incrementing the number of posts, adding a new message, or adding a new content item, for example. If the operations correspond to new rooms, processor module 420 may add to the list of rooms already stored in the cache. Thus, after taking the cache data and combining it with the operations queue data, processor module 420 may have a set of information that can be sent to the listener. For instance, processor module 420 may possess a view of the room that needs to be shown to the user in the UI.

It will thus be appreciated that the operations view may be local to the user device. Additionally, it is noted that some operations may be delayed before they can be sent to the server. For example, if a user shared ten photos and all ten of those photos had not yet been camera uploaded (i.e., added to the user's content management system) the operation to share the photos may wait until the ten photos have been uploaded before proceeding. While other operations on the device can run while that share operation is stalled, it may be the case that no other operations for that room can run. So, in that sense, the pending upload may operate as a blocker for everything in that room. Thus, it should be noted that the operations queue is a bit more complicated than just first in, first out.

In exemplary embodiments of the present invention, if a user adds any content, or takes any action via UI module 415, such as, adding a post to a room, for example, processor module 420 may send out a parallel command to CMS server 460 when it processes that operation locally. In turn, CMS server 460 may process that command by updating the server database and pinging all of the user's devices on which the content management application is running. As a result, each such device will run the delta thread and apply that state to their cache database, as described above. If the delta thread does not work (e.g., because of lack of network connectivity with a particular user device), it may continually retry, for example. As long as a user device is running the content management application, the delta thread can attempt to communicate with the server. Moreover, if connectivity is lost, the delta thread can wait until connectivity is restored.

Referring back now to the schematic network shown in FIG. 2, if user devices 202*a-c* are modifying existing rooms or attempting to create the same room with the same people, it is possible that, as a result of some or all of them losing connectivity, and because all user actions are processed locally, as described above, each user device 202*a-c* is only aware of what everybody knows in common plus what only he or she knows. Thus, two or three of the users in FIG. 2 may each create the same room, and populate it with a series of different photos. Upon all user devices returning to connectivity, everything will converge on the order that it was written into the server database, and thus the local views will be modified once the content management system server registers the new room and each user's delta thread synchronizes with the content management system server. Thus, local activity will be changed to the extent that other activity (which the local device did not know about when it was locally implemented) overrides it.

In exemplary embodiments of the present invention, this process may operate in the following manner: every post in a room, as well as every room, may have a "sort key" associated with it. Sort keys on the server may be, for example, generated from the timestamp that records the time the item was written into the server database. A sort key is just like a string, for example, "aaa" or "aab" that the devices know how to sort. In such exemplary embodiments, anything that a user creates locally will have a sort key that is guaranteed to be greater than anything on the server. So everything a user may create locally may be sorted basically at the newest end of anything on the server. But, as it is written up to the server, it will receive a new sort key based on when it went to the server. That is how everyone (i.e, all members) ends up with a consistent view of a room.

Thus, once a user adds a post, the command to add the post to the server returns the new server representation of the post. That is what gets written to the user's local cache at the same time the operation is erased. So in that case the user's local view of the room could conceivably change if, for example, he or she took photos that were viewed offline.

Thus, for example, due to multiple parties being involved in rooms, and each of those parties accessing the content management system server intermittently, as described above, and as illustrated in FIG. 2, one member of a given room, say "AMN room" could be looking at post A and then add post B, so he sees post A and post B in AMN room on his device. Additionally, another member of AMN room who is also offline could have post A in the room, and then they add post C, so they would be seeing, on their device, post A followed by post C in the same room. Both users will ultimately end up with either posts A, B, C or A, C, B in AMN room, depending on which user gets back to connectivity first, for example.

In exemplary embodiments of the present invention, as each user device regains connectivity and writes its operations to the server, a consistent (globally) sort key will be obtained, and thus both members of AMN room, for example, will end up seeing the same thing. Ultimately, a rule must be chosen to resolve such conflicts, which may be, for example, first to be saved on the content management system server wins. Thus, as regards a given user, posts may potentially be inserted on top of his or her post when he or she comes back on line.

Another interesting case arises when two users create a room with each other, or, for example, with each other and the same additional parties, and they are both offline. In some embodiments, as described in the Rooms Application, a room is defined on the server by a unique set of people who are members of the room. Thus, both of those posts will be displayed by the content management system in the same room because, if Alice shares content with Bob, and Bob shares content with Alice, that will be an Alice-Bob room on the server, no matter whose command first reached the server. Even if they both do it when they are offline, when they both come back online they will end up with the same global ID for the post, and for the room, because the server will just match those up, and they will not end up with two separate rooms, even though room creation happened for both of them offline. The only wrinkle is that whoever first came back online will have their posts listed first in a room, assuming that posts are listed in rooms in chronological order.

However, in a related example, if User A creates a room with Users B, C and D, and User B creates a room with Users A, C, E and F, both users A and B being offline at the time, initially each sees the room they created, with whatever posts they have added to it. Thus, on her user device, User A sees an ABCD Room, with whatever photographs she initially added to the room, and with any posts she added thereafter. Similarly, on her user device, User B sees an ABEF Room, with whatever photographs she initially added to the room, and with any posts she added thereafter. However, when each goes back online, both the ABCD Room and the ABCEF Room will exist, the first with the content form User A, the second with the content form User B. Although they each intended to share the content with each other, it cannot exist in the same room, unless the two are merged. As noted in the Rooms Application, every unique set of users is its own room, and inside of a room there are posts. Inside of each post there are items, such as photographs and messages, for example.

It is noted that while processor module 420 defines the interface that listeners have to implement, the actual implementations are in UI module 415. Thus, in some exemplary embodiments, processor module 420 says, so to speak, to UI module 415: "you need to create an object that has these methods", and then UI module 415 creates an implementation for each listener on each platform. Thus, listeners are created, and then they die when no longer needed by UI module 415. Additionally, in some exemplary embodiments, UI module 415 may not express any interest in the posts in a given room until a user actually views the room. However, for the list of rooms, in such exemplary embodiments, UI module 415 may keep it around the whole time the application is running so that it can immediately show the user a list of rooms when he or she slides open that panel. In some embodiments, this may be just a list of rooms, in other embodiments it may be both the list or rooms and notifications regarding any new posts added to the rooms.

It is understood that the criteria that determine what UI module 415 registers a listener for may change, and may depend on several factors. The goal is to register listeners for content, of whatever type, that the user may likely want to have displayed in UI module 415. That may be, for example, rooms and content has recently viewed, "recently" being defined using various metrics, rooms and content with a high frequency of participation in or interaction with, etc.

Replacing Local IDs with Global IDs

In exemplary embodiments of the present invention, all content may be assigned two identifiers. For example, in a rooms application, both rooms and posts may have two IDs, or up to two IDs. The same goes for any type of content or content item as well, in a standard application such as photographs, videos, etc. Thus, any post that has been written to the server, or any room that has been written to the server, may have a global ID, which may be, for example, an Edge-stored 128-bit number, or any other number or sufficiently large string. In general, a global ID needs to be large enough to uniquely identify all content across the entire content management system. However, as is obvious from the preceding description, in order to support all of the offline operation, a local ID is needed as well to reference, for example, posts and rooms that have been created locally but have not yet been sent to the server. Thus, in exemplary embodiments of the present invention, when UI module 415 creates a content item, such as, for example, a photograph, a post, or a room, it receives a local ID from processor module 420. UI module 415 may continue to use that local ID as long as it needs to. As noted above, once the operation goes up to the server the processor module 420 may update all operations in the queue that refer to the local ID with the newly received global ID.

Nonetheless, a lookup table, translation table, or the like, may still be maintained. This is so that, for example, if UI module 415 has created a room with local ID X, that keeps telling processor module 420 to add various posts to Room X, even though inside of processor module 420, Room X may already have been upgraded to be Room Y with a new global ID, processor module 420 needs to be able to translate these incoming requests from UI module 415 for posts to Room X (as UI module 415 knows it, using the old local ID) to the global ID that is being using locally within processor module 420 (and globally on the content management system server), Room Y. Accordingly, in exemplary embodiments of the present invention, the translation table associating local IDs with global IDs may be maintained for some time sufficient to clear any operation coming from UI module 415 referencing the local ID. However, after such time, it can be discarded. This may be, for example, when the application on the user device restarts, as described below.

Additional Use of Local IDs: Post Potency; Persistence of Local IDs

In what was described up to this point, local IDs may be used internally on a user device to facilitate full local functionality, and essentially immediate interactivity, with newly offline created content and data structures for organizing such content (e.g., rooms, albums, collections, etc.). However, local IDs may have other uses. Thus, in exemplary embodiments of the present invention, local IDs may also be used to guarantee item potency when creating content, such as rooms or posts, for example.

A potential problem is that processor module 420 may tell the content management system server to, for example, create a new room, say Room ABC. But the response from the server to processor module 420, which advises that the room was in fact created, may be lost—either because of a crash of the user device, a network connectivity drop, etc. In such cases processor module 420 will keep retrying this operation until it has been told by CMS server 460 that it has succeeded. To the server, such retrying of the request will appear as multiple requests. However, if each one of these operations to create content, a room, or a post, for example, is tagged with the globally unique local ID assigned by processor module on the user device, the server can ignore these second or third requests and just return the same global ID that it already created. It may look for a request with the same local ID and discard it as redundant. That way duplicates will not be created, even if the user device sends a request to create something to the server more than once. Thus, in various exemplary embodiments, local IDs are useful both from the translation to the UI standpoint as well as for insuring item potency.

Thus, in such exemplary embodiments, processor module 420 may send to the CMS server 460 a request that includes the local ID. Such a request may have the form "Create room by User A with Users M and N, local ID AFF2 B994 D223 1178 User A device XYZ", for example. Then the content management system server may track these local IDs so that it can reject or just ignore later duplicate requests for the same content item or room, for example.

Thus, when a room is first created, there is a local ID assigned to it. As soon as that first request to create the room makes it to the content management system server, the PM goes through the operations queue and updates all pending operations regarding that room to use the now received global room ID. However, it is noted that in some embodiments, for post IDs, every single post has a local post ID, even if it was created for an existing room. Post IDs are only used inside of that particular post, and thus never get replaced because they just go away with the operation as soon as the operation succeeds on the server.

But the local room IDs may be discarded as soon as the room is created. In some embodiments, UI module 415 may retain the local IDs until it has restarted, but then the next time the application restarts in UI module 415, the user device will not know about that local room ID at all. Thus, the translation tables exist to deal with dissonance between UI module 415 and processor module 420 (once the PM has received the global ID from the content management system server). In exemplary embodiments, it is desired to allow UI module 415 to refer to content, posts or rooms by either ID, and processor module 420 can just translate them as necessary. As noted, there may be no need to preserve the translation table once the application is restarted.

It is noted that there is another interesting aspect of local IDs, relating to push notifications. Push notifications are commonly used in iPhones™, where the server can send a user a message that results in a little pop-up message or notification. It will let a user launch an application as well, such as when, for example, a user receives an email or an alert from, for example, CNN, The Weather Channel™ or the like, and may tap the pop-up or notification to go to the relevant website, for example. In the context of the present invention, such push notifications may be used as essentially a connection between CMS server 460 and UI module 415 that is not mediated by processor module 420 on the user device. The following is an illustrative scenario. If a user creates a room on a content management application running on his iPhone™, his UI module will store that room's local ID in memory. If, after the server created the global ID for the room, but the processor module in the iPhone™ did not yet receive the message back from the content management system server, and someone in the next few minutes responds to that room, the content management system server, upon seeing that response, may send a push notification to the original user's iPhone™, and that push notification can have the global ID for that room or an abstraction thereof, or a link to that content. There is a very strict limit on how large these notifications can be; thus, in general, there is not enough room to also include the local ID.

Thus, the content management system server may send the remote ID because that will be useful for everyone, inasmuch as posts from other room members are already reaching the server; thus this is a way that the remote ID can get back to the UI module in a hurry without going through the processor module.

Figure 5:
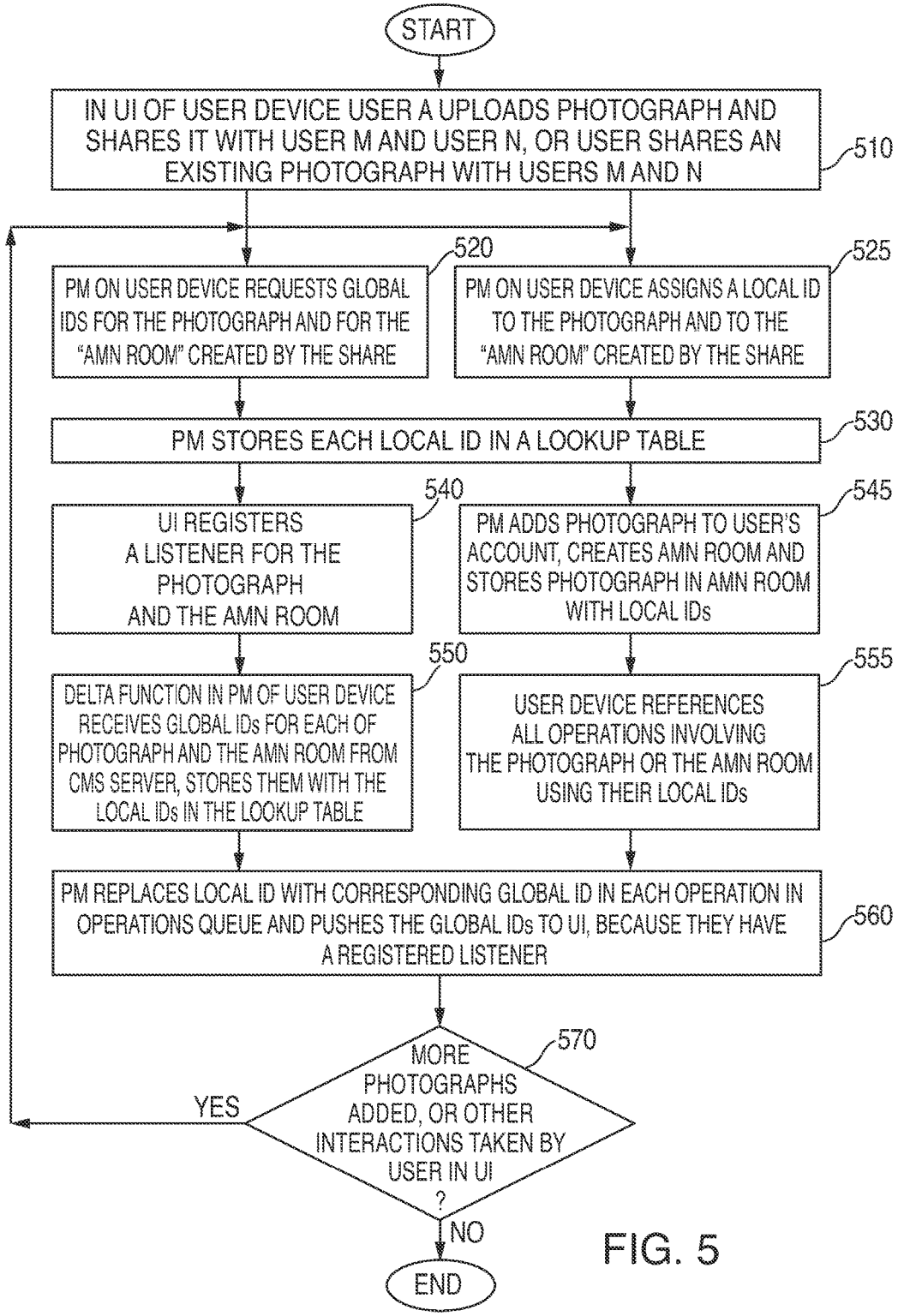
FIG. 5 shows an illustrative flowchart of a process for uploading photographs and sharing them with other users on a user device in accordance with various embodiments of the present invention.

FIG. 5: Exemplary Process Flow within a Rooms Application

With reference to FIG. 5, an exemplary process flow according to an exemplary embodiment of the present invention is shown. The process flow begins at start, and moves to step 510 where User A uploads a photograph and shares it with User M and User N on a user device, or, for example, User A shares an existing photograph with Users M and N. This functionality is analogous to 310 in FIG. 3, and creates a number of objects that will need to be identified by the content management system so that they can be implemented and executed. For example, when User A uploads a photograph he or she creates a new content item which must be assigned an identifier. When the user further shares it with two other users, say User M and User N, a room is created, as described above and in the Rooms Application, and the room needs to be assigned an ID and implemented. By "implementation" it is understood that the room will show up within the user's account on the content management system. Alternatively, if the user only shares an existing photograph with Users M and N, then the photograph already has an ID, ostensibly a global ID, and there is no reason to create a new one, so all that is created by this user action is the room.

However, this process actually involves a number of steps. The room must be created, and an ID assigned to it (i.e., a "Room ID"). In addition, as described, for example, in the Rooms Application, for any content items placed in a room (i) by virtue of sharing them initially with members of the room or (ii) subsequently by sharing them within an already extant room, a copy of the content item must be created and stored in a separate database—besides the original copy in the account of the sharer—such that it cannot be changed. This is the protocol for some exemplary embodiments of rooms, as more fully described in the Rooms Application. In addition to creating the separate copy of the photograph or the content item, it may be associated with the room in a record that holds information regarding all of the items and members in a room and any interactions by the members within the room regarding those content items. For example, in some exemplary embodiments a member of a room may: (i) post messages regarding content items, (ii) copy the content item to their own account and (iii) perform other tasks as may be desired. For each of those an instruction will issue on the user device, the instruction referencing an identifier of the object involved and the room involved.

From step 510, the process flow bifurcates and moves to steps 520 and 525 in parallel. This branching illustrates the novel functionality according to exemplary embodiments of the present invention, which facilitates a seamless interaction on the user device even where connectivity to the network has been terminated or is intermittent. With reference to 520, a processor module on the user device requests global IDs for the photograph and for the "AMN Room" created by the share at step 510. This is a wholly analogous to 320 of FIG. 3. However, in parallel, and without any delay or waiting period (i.e., at the same time), at 525 the processor module assigns local IDs to the photograph and to the AMN room. This allows the photograph as well as the room to "exist" on the user device even if they have never been officially recognized by the content management system server. Moreover, this parallel process begins as soon as the user action at 510 occurs. This is what avoids the delay and creates the seamless local interaction perceived by the user.

From steps 520 and 525, the process flow moves to step 530 where the processor stores each local ID created at 525 in a lookup table, translation table, or the like, which has space saved for each corresponding global ID expected to be received from the content management system server once connectivity is restored. Instead of a lookup table, for example, any data structure may be used, such as, for example, a translation table, a database record or any other convenient logical association that allows a subsequent process to quickly and easily match up the global IDs—once they are received from the content management system server—with the local IDs generated at step 525.

From step 530, the process flow again bifurcates, one path dealing with the global IDs and the other with the local IDs. Thus, at step 540 a UI module registers a listener for each of the photograph and the AMN Room; in this regard step 540 is analogous to step 330 of FIG. 3. However, in parallel at 545, the processor module now (i) adds the photograph to the user's account, (ii) creates the AMN Room, and (iii) stores the photograph in the AMN Room, all using their local IDs. Adding a photograph to an account as described herein also implies displaying the photograph within the user's account immediately upon its creation without waiting for the server to send back a global ID before it can be manipulated.

Similarly, the AMN Room may be displayed within the user's content management system application, as shown in the Rooms Application, even though it does not yet "exist" from the point of view of the content management system server. Here it is important to note, that the AMN room created by User A will be displayed on User A's user device, even if a similar AMN room has already been created by User M or User N, for example, by sharing their own photograph with Users A and N, or with Users A and M, as the case may be, and that other "AMN room" already exists from the point of view of the content management system server. In other words, parallel AMN rooms can appear on each of User A's, User M's and User N's user devices although only one of them has been recognized, or will be recognized, by the content management system server, and eventually assigned a global ID.

From step 540, the process flow moves to step 550, where the delta thread in the processor module of the user device receives the global IDs for each of the photograph and the AMN Room, and associates them with their respective local IDs in the lookup table. For example, for each local ID in the look up table, the corresponding global ID is associated. This may be accomplished, for example, by the user device including the local ID, or a reference thereto, when requesting the global ID such that when the global ID returns from the server, it is known to which local ID it corresponds. This also prevents mistaken assignment of multiple global IDs if the user device resends the same request of step 520 repeatedly and does not receive a response back form the server. This may occur, for example, if there is a network delay or a crash of the user device, for example, and the request is resent by the user device from a cache, or the like, following the crash. Alternatively, for example, the request for global IDs sent to the server (at step 520) may include an operation or instruction number, or other unique identifier, to allow the server to weed out redundant requests.

Similarly, on the right side of FIG. 5, from step 545, the process flow moves to step 555 where the user device references all operations in the operations queue involving the photograph or the room, using the appropriate local ID, whether a photo ID or a room ID, or other. This means that User A can continue to manipulate, operate and interact with both the photograph, as well as the newly created room, as much as he or she desires. Every interaction that involves the photograph, such as, for example, attaching a message to it, or activating a "like" indicator, or any other interaction, such as, for example, sharing it with yet another party not a member of the room, is referenced by the user device using the local ID for the photograph. Similarly, if the user now decides to add additional photographs, whether they are already uploaded to her account or not, to room AMN, those photographs will be all given local IDs if they do not already have them, and those photographs will be associated with the room AMN, using the local Room ID for the room assigned at step 525. Thus, it can easily be imagined how, depending on the length of disconnectedness of the user device, a number of objects can be created and a number of instructions for requesting interactions with those objects can be queued all using the only IDs available—which are the local IDs assigned at step 525.

From steps 550 and 555, the process flow unites again at step 560 where the processor module, now having received the global IDs at step 550, replaces each local ID in a queued operation with the corresponding global ID, and pushes the global IDs to the UI, inasmuch as each of these items has a registered listener in the UI. As noted above, however, if a global ID is received in the processor module for which there is no registered listener, then there is no need to push that global ID to the UI module (as the item which it identifies is not expected to be displayed to the user), and thus in various exemplary embodiments, it will not be pushed to the UI. Thus, all the local IDs being used to reference content items appearing in User A's account, or content items being copied and associated with a room, or any of the above, all of which could heretofore only be referenced on the user device with the local ID, may now be processed to replace that local ID with the newly acquired global ID so that the local state of the user device can be synchronized with that of the server.

From step 560, the process flow moves to step 570. Here the process may query whether the user has added more photographs to her account or has requested other shares (i.e., are there more add content item, add room, add content to room, etc., instructions in a queue). If, YES, then the process flow returns to step 510 where, in the case of a photograph, the photograph is uploaded if it is not already part of the user's account, and in the case of a share, any shares with other users are taken note of, and any rooms needing to be created resulting from those shares are created. If NO at 570, then process flow ends.

It is noted that the process flow of FIG. 5 is merely illustrative, and would equally apply to any content item, data structure, message, or interaction therewith that would be assigned an ID number in the content management system.

Figure 6:
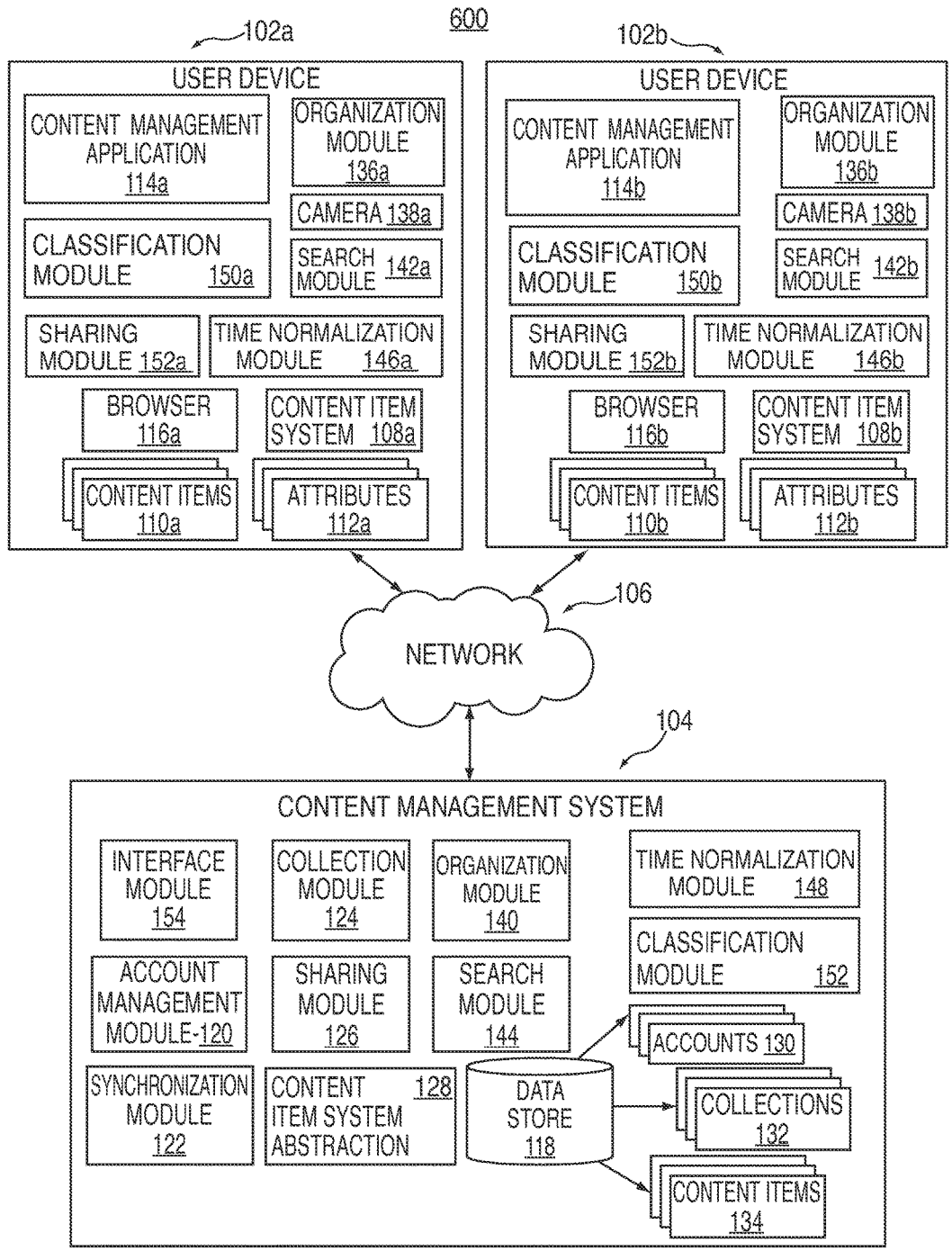
FIG. 6 shows another exemplary system in accordance with various embodiments.

FIG. 6 shows an exemplary system in accordance with various embodiments. In some embodiments, system 600 of FIG. 6 may be substantially similar to system 100 of FIG. 1, with the exception that the former may present elements of system 100 at a more granular level (e.g., modules, applications, etc.).

In some embodiments, user devices 102 may be used to create, access, modify, and manage content items, such as content items 110*a* and 110*b* (collectively 110), stored locally within content item system 108*a* and 108*b* (collectively systems 108) on user device 102 and/or stored remotely on content management system 104 (e.g., within data store 118). For example, user device 102*a* may access content items 110*b* stored remotely with data store 118 of content management system 104 and may, or may not, store content item 110*b* locally within content item system 108*a* on user device 102*a*. Continuing with the example, user device 102*a* may temporarily store content item 110*b* within a cache locally on user device 102*a*, make revisions to content item 110*b*, and the revisions to content item 110*b* may be communicated and stored in data store 118 of content management system 104. Optionally, a local copy of content item 110*a* may be stored on user device 102*a*. In some embodiments, data store 118 may include one or more collections 132 of content items. For example, collections 132 may include one or more content items having similar properties (e.g., metadata) and/or including similar content.

In some embodiments, user devices 102 may include camera 138 (e.g., 138*a* and 138*b*) to capture and record digital images and/or videos. User devices 102 may capture, record, and/or store content items, such as images, using camera 138. For example, camera 138 may capture and record images and store metadata with the images. Metadata may include, but is not limited to, the following: creation time timestamp, geolocation, orientation, rotation, title, and/or any other attributes or data relevant to the captured image. Metadata values may be stored as attribute 112 name-value pairs, tag-value pairs, and/or any other method, or any combination thereof, to associate the metadata with the content item and easily identify the type of metadata. In some embodiments, attributes 112 may be tag-value pairs defined by a particular standard, including, but not limited to, Exchangeable Image File Format ("Exif"), JPEG File Interchange Format (Jfif), and/or any other standard.

In some embodiments, user devices 102 may include time normalization module 146, and content management system 104 may include time normalization module 148. Time normalization module 146 (e.g., 146a and 146b) may be used to normalize dates and times stored with a content item. Time normalization module 146, counterpart time normalization module 148, and/or any combination thereof, may be used to normalize dates and times stored for content items. The normalized times and dates may be used to sort, group, perform comparisons, perform basic math, and/or cluster content items.

In some embodiments, user devices 102 may include organization module 136, and content management system 104 may include organization module 140. Organization module 136 (e.g., 136a and 136b) may be used to organize content items into clusters or collections of content items, organize content items to provide samplings of content items for display within user interfaces, and/or retrieve organized content items for presentation. Organization module 136 may utilize any clustering algorithm. Organization module 136 may be used to identify similar content items for clusters in order to organize content items for presentation within user interfaces on user devices 102 and content management system 104. Similarity rules may be defined to create one or more numeric representations embodying information on similarities between each of the content items in accordance with various similarity rules. Organization module 136 may use numeric representations as a reference for similarity between content items in order to cluster the content items.

In some embodiments, content items may be organized into clusters to aid with retrieval of similar content items in response to search requests. For example, organization module 136a may identify that two images are similar and may group the images together in a cluster. Organization module 136a may process content items to determine clusters independently and/or in conjunction with counterpart organization module (e.g., 140 and/or 136b). In other embodiments, organization module 136a may only provide clusters identified with counterpart organization modules (e.g., 140 and/or 136b) for presentation. Continuing with this example, processing of content items to determine clusters may be an iterative process that may be executed upon receipt of new content items and/or new similarity rules.

In some embodiments, user device 102a may include classification module 150a, while user device 102b may include classification module 150b (collectively 150), which may be used independently, in combination with classification module 152 include on content management system 104, and/or any combination thereof to classify content items, rectify content items, and/or classify images. For example, the classification modules 150 and/or 152 may be used to determine if an image includes a document, and if there so, determine a type of document stored therein. Content item rectification may be performed to correct, perform further transformations, and/or crop content items to improve the display of the content items (e.g., correct the display of a document within an image).

In some embodiments, user device 102a may include search module 142a, while user device 102b may include search module 142b, which collectively may be referred to as search modules 142. Content management system 104 may also be provided with counterpart search module 144. Each of search modules 142 and 144 may be capable of supporting searches for content items located on both user devices 102 and/or content management system 104. A search request may be received by search module 142 and/or 144 that requests one or more content items. In some embodiments, the search may be handled by searching metadata and/or attributes assigned to content items during the provision of management services. For example, cluster markers stored with content items may be used to find content items by date. In this particular scenario, cluster markers may indicate an approximate time, or average time, for the content items stored with the cluster marker, and the marker may be used to speed the search and/or return the search results with the contents of the cluster with particular cluster markers.

Content items 110 managed by content management system 104 may be stored locally within content item system 108 of respective user devices 102 and/or stored remotely within data store 118 of content management system 104 (e.g., content items 134 in data store 118). Content management system 104 may provide synchronization of content items managed thereon. Attributes 112a and 112b (collectively 112) or other metadata may also be stored with content items 110. For example, a particular attribute may be stored with a content item to track content items locally stored on user devices 102 that are managed and/or synchronized by content management system 104. In some embodiments, attributes 112 may be implemented using extended attributes, resource forks, or any other implementation that allows for storing metadata with a content item that is not interpreted by a content item system, such as content item system 108. In particular, attributes 112a and 112b may be content identifiers for content items. For example, the content identifier may be a unique or nearly unique identifier (e.g., number or string) that identifies the content item. By storing a content identifier with the content item, the content item may be tracked. For example, if a user moves the content item to another location within content item system 108 hierarchy and/or modifies the content item, then the content item may still be identified within content item system 108 of user device 102. Any changes or modifications to the content item identified with the content identifier may be uploaded or provided for synchronization and/or version control services provided by content management system 104.

A stand-alone content management application 114a and 114b (collectively 114), client application, and/or third-party application may be implemented on user devices 102a and 102b, respectively, to provide a user interface to a user for interacting with content management system 104. Content management application 114 may expose the functionality provided with content management interface module 154 and accessible modules for user device 102. Web browser 116a and 116b (collectively 116) may be used to display a web page front end for a client application that may provide content management 104 functionality exposed/provided with content management interface module 154.

Content management system 104 may allow a user with an authenticated account to store content, as well as perform management tasks, such as retrieve, modify, browse, synchronize, and/or share content with other accounts. Various embodiments of content management system 104 may have elements including, but not limited to, content management interface module 154, account management module 120, synchronization module 122, collections module 124, sharing module 126, file system abstraction 128, data store 118, and organization module 140. Content management interface module 154 may expose the server-side or back end functionality/capabilities of content management system 104. For example, a counter-part user interface (e.g., stand-alone application, client application, etc.) on user devices 102 may be implemented using content management interface module 154 to allow a user to perform functions offered by modules of content management system 104.

The user interface displayed on user device 102 may be used to create an account for a user and/or authenticate the user to use the account using account management module 120. Account management module 120 may provide the functionality for authenticating use of an account by a user and/or user device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., content item edit history), maximum storage space authorized, storage space used, content storage locations, security settings, personal configuration settings, content sharing data, etc. An amount of storage space on content management system 104 may be reserved, allotted, allocated, stored, and/or may be accessed with an authenticated account. The account may be used to access content items 134 and/or content items 110 within data store 118 for the account, and/or content items 134 and/or content items 110 made accessible to the account that are shared from another account. In some embodiments, account management module 120 may interact with any number of other modules of content management system 104.

An account on content management system 104 may, in some embodiments, be used to store content such as documents, text items, audio items, video items, etc., from one or more user devices 102 authorized by the account. The content may also include collections of various types of content with different behaviors, or other mechanisms of grouping content items together. For example, an account may include a public collection that may be accessible to any user. In some embodiments, the public collection may be assigned a web-accessible address. A link to the web-accessible address may be used to access the contents of the public folder. In another example, an account may include a photos collection that may store photos and/or videos, and may provide specific attributes and actions tailored for photos and/or videos. The account may also include an audio collection that provides the ability to play back audio items and perform other audio related actions. The account may still further include a special purpose collection. An account may also include shared collections or group collections that may be linked with and available to multiple user accounts. In some embodiments, access to a shared collection may differ for different users that may be capable of accessing the shared collection.

Content items 110 and/or content items 134 may be stored in data store 118. Data store 118 may, in some embodiments, be a storage device, multiple storage devices, or a server. Alternatively, data store 118 may be cloud storage provider or network storage accessible via one or more communications networks. Content management system 104 may hide the complexity and details from user devices 102 by using content item system abstraction 128 (e.g., a content item system database abstraction layer) so that user devices 102 do not need to know exactly where the content items are being stored by content management system 104. Embodiments may store the content items in the same collections hierarchy as they appear on user device 102. Alternatively, content management system 104 may store the content items in various orders, arrangements, and/or hierarchies. Content management system 140 may store the content items in a network accessible storage (SAN) device, in a redundant array of inexpensive disks (RAID), etc. Content management system 104 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a content item system, or any other collection of data. In some embodiments, each content item stored in data store 118 may be assigned a system-wide unique identifier.

Data store 118 may, in some embodiments, decrease the amount of storage space required by identifying duplicate content items or duplicate chunks of content items. Instead of storing multiple copies, data store 118 may store a single copy of content item 134 and then use a pointer or other mechanism to link the duplicates to the single copy. Similarly, data store 118 may store content items 134 more efficiently, as well as provide the ability to undo operations, by using a content item version control that tracks changes to content items, different versions of content items (including diverging version trees), and a change history. The change history may include a set of changes that, when applied to the original content item version, produce the changed content item version.

Content management system 104 may be configured to support automatic synchronization of content from one or more user devices 102. The synchronization may be platform independent. That is, the content may be synchronized across multiple user devices 102 of varying type, capabilities, operating systems, etc. For example, user device 102a may include client software, which synchronizes, via synchronization module 122 at content management system 104, content in content item system 108 of user devices 102 with the content in an associated user account. In some cases, the client software may synchronize any changes to content in a designated collection and its sub-collection, such as new, deleted, modified, copied, or moved content items or folders. In one example of client software that integrates with an existing content management application, a user may manipulate content directly in a local folder, while a background process monitors the local content item for changes and synchronizes those changes to content management system 104. In some embodiments, a background process may identify content that has been updated at content management system 104 and synchronize those changes to the local collection. The client software may provide notifications of synchronization operations, and may provide indications of content statuses directly within the content management application. In some embodiments, user device 102 may not have a network connection available. In this scenario, the client software may monitor the linked collection for content item changes and queue those changes for later synchronization to content management system 104 when a network connection is available. Similarly, a user may manually stop or pause synchronization with content management system 104.

A user may also view or manipulate content via a web interface generated and served by content management interface module 154. For example, the user may navigate in a web browser to a web address provided by content management system 104. Changes or updates to content in data store 118 made through the web interface, such as uploading a new version of a content item, may be propagated back to other user devices 102 associated with the user's account. For example, multiple user devices 102, each with their own client software, may be associated with a single account, and content items in the account may be synchronized between each of user devices 102.

Content management system 104 may include sharing module 126 for managing sharing content and/or collections of content publicly or privately. Sharing module 126 may manage sharing independently or in conjunction with counterpart sharing module 152*a*, located on user device 102*a*, and sharing module 152*b* located on user device 102*b* (collectively sharing modules 152). Sharing content publicly may include making the content item and/or the collection accessible from any device in network communication with content management system 104. Sharing content privately may include linking a content item and/or a collection in data store 118 with two or more user accounts so that each user account has access to the content item. The sharing may be performed in a platform independent manner. That is, the content may be shared across multiple user devices 102 of varying type, capabilities, operating systems, etc. For example, one or more share links may be provided to a user, or a contact of a user, to access a shared content item. The content may also be shared across varying types of user accounts. In particular, the sharing module 126 may be used with collections module 124 to allow sharing of a virtual collection with another user or user account. A virtual collection may be a collection of content identifiers that may be stored in various locations within content item systems 108 of user device 102 and/or stored remotely at content management system 104.

In some embodiments, the virtual collection for an account with a content management system may correspond to a collection of one or more identifiers for content items (e.g., identifying content items in storage). The virtual collection is created with collections module 124 by selecting from existing content items stored and/or managed by content management system and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item to a directory) the content item in another location within data storage in order to place the content item in the collection.

In some embodiments, content management system 104 may be configured to maintain a content directory or a database table/entity for content items where each entry or row identifies the location of each content item in data store 118. In some embodiments, a unique or a nearly unique content identifier may be stored for each content item stored in data store 118.

In some embodiments, metadata may be stored for each content item. For example, metadata may include a content path that may be used to identify the content item. The content path may include the name of the content item and a content item hierarchy associated with the content item (e.g., the path for storage locally within a user device 102). Content management system 104 may use the content path to present the content items in the appropriate content item hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator ("URL"), which allows any web browser to access the content in content management system 104 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be sent to content management system 104 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be sent to content management system 104 which may use the received content identification data to identify the appropriate content entry or database row and return the content item associated with the content entry or database row.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or "false" to indicate that a URL to the content item has not been created. Sharing module 126 may be configured to change the value of the flag to 1 or "true" after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This may allow a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Exemplary Systems

In exemplary embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for providing a user interface to a user capable of a full set of interactivity features in a variety of operational modes, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed:

1. A method comprising:

assigning at a client device, a local identifier to a content item to be stored within a shared virtual space to be created and hosted by a content management system;

associating the local identifier of the content item to the shared virtual space;

detecting, at the client device, a user interaction with the content item;

associating, in response to detecting the user interaction with the content item, the local identifier with the user interaction;

queuing the user interaction for upload to the content management system within the shared virtual space based on the local identifier of the content item being associated with the shared virtual space, wherein the content management system provides access of the content item to a plurality of client devices associated with the shared virtual space; and prior to completing an upload of the user interaction to the content management system:

presenting, in a user interface on the client device, a local representation of the user interaction with the content item within a display of the shared virtual space on the client device;

receiving, from the content management system, an assignment of a system-wide identifier for the content item, the system-wide identifier of the content item being associated with the shared virtual space and identifying the content item across the entire content management system;

replacing, at the client device and in response to receiving the system-wide identifier, the local identifier of the content item with the system-wide identifier of the content item for the queued user interaction; and in response to detecting that the local identifier associated with the queued interaction has been replaced by the system-wide identifier, uploading the user interaction to the content management system.

2. The method of claim 1, wherein replacing the local identifier of the content item with the system-wide identifier further comprises communicating the system-wide identifier to a listener module.

3. The method of claim 1, wherein the local identifier is stored in a data structure on the client device, and wherein replacing the local identifier of the content item with the system-wide identifier further comprises updating the data structure.

4. The method of claim 1, wherein the user interaction with the content item comprises one or more of adding the content item to the shared virtual space or sharing the content item with at least one other user of the content management system.

5. The method of claim 1, wherein the content item comprises one or more of a collection of content items, a message, a data structure, an image, a video, or a link.

6. The method of claim 1, further comprising registering the content item with a listener module comprising a database, the database comprising a local cache representative of a state of the content management system.

7. The method of claim 6, wherein the database is operable to run a thread to detect any changes that occur on the content management system.

8. The method of claim 7, wherein the thread continually runs as long as the client device is connected to the content management system.

9. The method of claim 6, wherein the database manages photos of a user associated with the client device.

10. The method of claim 1, further comprising storing, at the client device:
  global data comprising data that has been synchronized with the content management system; and
  local data comprising data that has been generated locally but that has not yet been synchronized with the content management system.

11. The method of claim 1, further comprising registering the content item with a listener module, wherein the listener module registers one or more of a rooms listener, a post listener, or a room members listener.

12. The method of claim 1, wherein:
  a processing module defines an interface for listeners to implement; and
  listener implementations are provided in a user interface module.

13. A non-transitory computer readable medium comprising instructions that, when executed by at least one processor, cause a user device to:
  assign a local identifier to at least one content item to be stored within a shared virtual space to be created and hosted by a content management system;
  associate the local identifier of the at least one content item to the shared virtual space;
  detect a user interaction with the at least one content item;
  associate, in response to detecting the user interaction with the at least one content item, the local identifier with the user interaction;
  queue the user interaction for upload to the content management system within the shared virtual space based on the local identifier of the at least one content item being associated with the shared virtual space, wherein the content management system provides access of the content item to a plurality of client devices associated with the shared virtual space; and
  prior to completing an upload of the user interaction to the content management system:
    present results of the user interaction with the at least one content item within a user interface on the user device as if the user interaction had been implemented on the content management system;
    receive, from the content management system, an assignment of a system-wide identifier for the at least one content item, the system-wide identifier of the at least one content item being associated with the shared virtual space and identifying the at least one content item across the entire content management system;
    replace, in response to receiving the assignment of the system-wide identifier for the at least one content item, the local identifier associated with the at least one content item with the system-wide identifier of the at least one content item for the queued user interaction; and
    in response to detecting that the local identifier associated with the queued interaction has been replaced by the system-wide identifier, upload the user interaction to the content management system.

14. The non-transitory computer readable medium of claim 13, wherein the user device is intermittently connected to the content management system over a data network.

15. The non-transitory computer readable medium of claim 13, wherein the user device comprises a local cache, the local cache comprising a database representative of a state of the content management system.

16. The non-transitory computer readable medium of claim 15, wherein the database within the local cache is continually updated by a thread running on the user device, wherein the thread monitors changes in the state of the content management system.

17. The non-transitory computer readable medium of claim 13, further comprising instructions that, when executed by the at least one processor of the user device, cause the user device to: prior to completing an upload of the user interaction to the content management system, detect an additional user interaction with respect to the one or more content items, the additional user interaction comprising one or more of adding an additional content item to the shared virtual space, adding at least one data structure, or interacting with at least one data structure.

18. The non-transitory computer readable medium of claim 17, further comprising instructions that, when executed by the at least one processor of the user device, cause the user device to: prior to completing the upload of the user interaction to the content management system, assign the local identifier to the additional user interaction.

19. The non-transitory computer readable medium of claim 13, further comprising instructions that, when executed by the at least one processor of the user device, cause the user device to:
  receive a confirmation that the content management system implemented the user interaction within the shared virtual space; and
  presenting a push notification corresponding to the confirmation within the user interface of the user device.

20. The method of claim 1, further comprising:
  assigning, at the client device, an additional local identifier to an additional content item based on a determination that the additional content item corresponds to a second shared virtual space;
  detecting, at the client device, an additional user interaction with the additional content item;
  associating, in response to detecting the additional user interaction with the additional content item, the additional local identifier with the additional user interaction;
  receiving, from the content management system, an assignment of an additional system-wide identifier for the additional content item corresponding to the second shared virtual space;

replacing, at the client device and in response to receiving the additional system-wide identifier of the additional content item, the additional local identifier with the additional system-wide identifier of the additional content item; and uploading the user interaction associated with the content item in parallel with the additional user interaction associated with the additional content item.

\* \* \* \* \*